United States Patent
Cao et al.

(10) Patent No.: US 11,281,325 B2
(45) Date of Patent: Mar. 22, 2022

(54) TOUCH CIRCUIT, TOUCH PANEL, DISPLAY PANEL AND DISPLAY DEVICE

(71) Applicant: BOE TECHNOLOGY GROUP CO., LTD., Beijing (CN)

(72) Inventors: Xueyou Cao, Beijing (CN); Haisheng Wang, Beijing (CN); Xiaoliang Ding, Beijing (CN); Chihjen Cheng, Beijing (CN); Yuzhen Guo, Beijing (CN); Yanling Han, Beijing (CN); Wei Liu, Beijing (CN); Pengpeng Wang, Beijing (CN); Ping Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 635 days.

(21) Appl. No.: 16/303,961

(22) PCT Filed: Apr. 3, 2018

(86) PCT No.: PCT/CN2018/081696
§ 371 (c)(1),
(2) Date: Nov. 21, 2018

(87) PCT Pub. No.: WO2019/011013
PCT Pub. Date: Jan. 17, 2019

(65) Prior Publication Data
US 2021/0223928 A1  Jul. 22, 2021

(30) Foreign Application Priority Data
Jul. 14, 2017 (CN) .......................... 201710574042.X

(51) Int. Cl.
*G09G 3/32* (2016.01)
*G06F 3/041* (2006.01)

(52) U.S. Cl.
CPC .......... *G06F 3/0416* (2013.01); *G06F 3/0412* (2013.01); *G06F 3/04144* (2019.05)

(58) Field of Classification Search
CPC ... G06F 3/04144; G06F 3/0412; G06F 3/0416
See application file for complete search history.

(56) References Cited

U.S. PATENT DOCUMENTS

2017/0315653 A1* 11/2017 Vandermeijden ..... G06F 3/0447

FOREIGN PATENT DOCUMENTS

| CN | 102483663 A | 5/2012 |
|---|---|---|
| CN | 103645821 A | 3/2014 |

(Continued)

OTHER PUBLICATIONS

First Office Action dated Mar. 4, 2019 corresponding to Chinese application No. 201710574042.X.

(Continued)

*Primary Examiner* — Michael A Faragalla
(74) *Attorney, Agent, or Firm* — Nath, Goldberg & Meyer; Joshua B. Goldberg

(57) ABSTRACT

Provided is a touch circuit including first and second voltage input terminals, a pressure sensing circuit and an output circuit, the first voltage input terminal is configured to input a first voltage signal, the second voltage input terminal is configured to input a second voltage signal, the first voltage signal is different from the second voltage signal, an input terminal of the pressure sensing circuit is coupled to the first voltage input terminal, an output terminal of the pressure sensing circuit is coupled to an input terminal of the output circuit, a control terminal of the output circuit is configured to receive a control signal, and the output circuit is configured to control on/off state between the input terminal of the output circuit and the output terminal of the output circuit (Continued)

according to the control signal. A touch panel, a display panel and a display device are also provided.

14 Claims, 5 Drawing Sheets

(56) References Cited

FOREIGN PATENT DOCUMENTS

| CN | 103995631 A | 8/2014 |
|---|---|---|
| CN | 104423647 A | 3/2015 |
| CN | 106020563 A | 10/2016 |
| CN | 106462019 A | 2/2017 |
| CN | 107340924 A | 11/2017 |

OTHER PUBLICATIONS

International Search Report dated Jul. 9, 2018 corresponding to application No. PCT/CN2018/081696.

* cited by examiner

TOUCH CIRCUIT, TOUCH PANEL, DISPLAY PANEL AND DISPLAY DEVICE

CROSS-REFERENCE TO RELATED APPLICATIONS

This is a National Phase Application filed under 35 U.S.C. 371 as a national stage of PCT/CN2018/081696, filed Apr. 3, 2018, an application claiming the benefit of Chinese Application No. 201710574042.X, filed Jul. 14, 2017, the content of each of which is hereby incorporated by reference in its entirety.

TECHNICAL FIELD

The present disclosure relates to a touch circuit, a touch panel including the touch circuit, a display panel including the touch circuit, a display device including the touch panel and a display device including the display panel.

BACKGROUND

Currently, some touch display devices are provided with a pressure sensing function, that is, different operations can be performed according to different touch pressures. However, in such touch display devices with the pressure sensing function, a complex pressure sensing circuit is generally provided for the pressure sensing function.

SUMMARY

The present disclosure provides a touch circuit, a touch panel including the touch circuit, a display panel including the touch circuit, a display device including the touch panel and a display device including the display panel.

In an aspect, there is provided a touch circuit including a first voltage input terminal, a pressure sensing circuit and an output circuit, the first voltage input terminal is configured to input a first voltage signal, an input terminal of the pressure sensing circuit is coupled to the first voltage input terminal, an output terminal of the pressure sensing circuit is coupled to an input terminal of the output circuit, the pressure sensing circuit includes a pressure sensing resistor, a control terminal of the output circuit is configured to receive a control signal, and the output circuit is configured to control on/off state between the input terminal of the output circuit and the output terminal of the output circuit according to the control signal.

In some implementations, the pressure sensing circuit further includes a voltage dividing sub-circuit, the touch circuit further includes a second voltage input terminal, the second voltage input terminal is configured to input a second voltage signal, the second voltage signal is different from the first voltage signal, a first terminal of the pressure sensing resistor is coupled to the first voltage signal input terminal, a second terminal of the pressure sensing resistor is coupled to a first terminal of the voltage dividing sub-circuit, and the second terminal of the pressure dividing resistor is further coupled to the output terminal of the pressure sensing circuit, and a second terminal of the voltage dividing sub-circuit is coupled to the second voltage input terminal.

In some implementations, the voltage dividing sub-circuit includes a fixed resistor.

In some implementations, the voltage dividing sub-circuit includes a voltage dividing transistor and a voltage dividing control signal input terminal, the voltage dividing control signal input terminal is configured to input a voltage dividing control signal, a gate of the voltage dividing transistor is coupled to the voltage dividing control signal input terminal, a first electrode of the voltage dividing transistor is coupled to the second terminal of the pressure sensing resistor, a second electrode of the voltage dividing transistor is coupled to the second voltage input terminal, the voltage dividing transistor is configured to couple the first electrode of the voltage dividing transistor to the second electrode of the voltage dividing transistor according to the voltage dividing control signal received by the gate of the voltage dividing transistor.

In some implementations, the pressure sensing circuit further includes a voltage dividing sub-circuit and an amplifying transistor, the touch circuit further includes a second voltage input terminal, the second voltage input terminal is configured to input a second voltage signal, the second voltage signal is different from the first voltage signal, a first terminal of the pressure sensing resistor is coupled to the first voltage signal input terminal, a second terminal of the pressure sensing resistor is coupled to a first terminal of the voltage dividing sub-circuit, the second terminal of the pressure sensing resistor is further coupled to a gate of amplifying transistor, the first terminal of the voltage dividing sub-circuit is coupled to the second terminal of the pressure sensing resistor, a second terminal of the voltage dividing sub-circuit is coupled to the second voltage input terminal, a first electrode of the amplifying transistor is coupled to the first terminal of the pressure sensing resistor, and a second electrode of the amplifying transistor is coupled to the output terminal of the pressure sensing circuit.

In some implementations, the output circuit includes an output transistor, a gate of the output transistor is coupled to the control terminal of the output circuit, a first electrode of the output transistor is coupled to the input terminal of the output circuit, and a second electrode of the output transistor is coupled to the output terminal of the output circuit.

In another aspect, there is provided a touch panel including a plurality of touch scanning lines and a plurality of touch output lines, the touch scanning lines and the touch output lines are intersected to divide the touch panel into a plurality of touch elements, each of the touch elements includes the touch circuit of the present disclosure, control terminals of output circuits of touch circuits in a same row are coupled to corresponding one of the touch scanning lines, and output terminals of touch circuits in a same column are coupled to corresponding one of the touch output lines.

In some implementations, each of the touch circuits includes a voltage dividing transistor, the touch panel further includes a plurality of voltage dividing control signal lines, each row of touch elements correspond to one of the voltage dividing control signal lines, and gates of voltage dividing transistors of the touch circuits in a same row are coupled to corresponding one of the voltage dividing control signal lines.

In further another aspect, there is provided a display device including the touch panel of the present disclosure, the display device further includes an addressing circuit, an input terminal of the addressing circuit is coupled to the touch output lines, and the addressing circuit is configured to determine a coordinate of a touch point and a touch pressure applied to the touch point according to signals output from the touch output lines.

In still another aspect, there is provided a display panel including a plurality of pixel elements, at least a portion of the pixel elements each includes the touch circuit of the present disclosure, the display panel further includes a plurality of touch scanning lines and a plurality of touch output lines, control terminals of output circuits of touch circuits in a same row are coupled to corresponding one of the touch scanning lines, and output terminals of touch circuits in a same column are coupled to corresponding one of the touch output lines.

In still another aspect, there is provided a display device including the display panel of the present disclosure, the display device further incudes an addressing circuit, an input terminal of the addressing circuit is coupled to the touch output lines, the addressing circuit is configured to determine a coordinate of a touch point and a touch pressure applied to the touch point according to signals output from the touch output lines.

DESCRIPTION OF DRAWINGS

Drawings are provided for explaining the present disclosure in conjunction with embodiments, so that the present disclosure will be understood better, and the drawings constitute a part of specification, but not limit the present disclosure. In the drawings.

DESCRIPTION OF EMBODIMENTS

Embodiments of the present disclosure will be described in detail below in conjunction with the drawings. It should be understood that, the embodiments are described for explaining and illustrating the present disclosure, but not limit the present disclosure.

Figure 1:
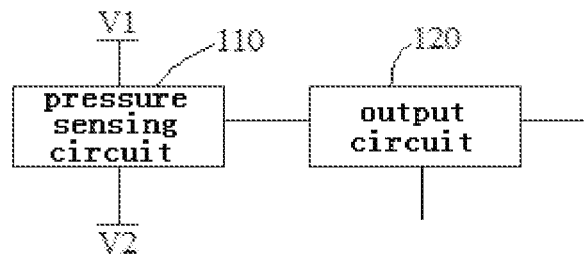
FIG. 1 shows a circuit diagram of a touch circuit in an embodiment of the present disclosure.

As an aspect, an embodiment of the present disclosure provides a touch circuit. As shown in FIG. 1, the touch circuit includes a first voltage input terminal V1, a pressure sensing circuit 110 and an output circuit 120.

The first voltage input terminal V1 is configured to input a first voltage signal, an input terminal of the pressure sensing circuit 110 is coupled to the first voltage input terminal V1, an output terminal of the pressure sensing circuit 110 is coupled to an input terminal of the output circuit 120, and the pressure sensing circuit 110 includes a pressure sensing resistor. A control terminal of the output circuit 120 is configured to receive a control signal, and the output circuit 120 is configured to control on/off state between the input terminal of the output circuit 120 and the output terminal of the output circuit 120 according to the control signal.

Figure 2:
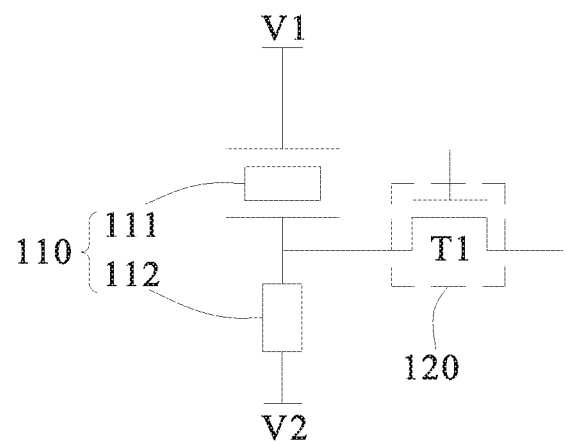
FIG. 2 shows a diagram of an implementation of the touch circuit in an embodiment of the present disclosure.
Figure 3:
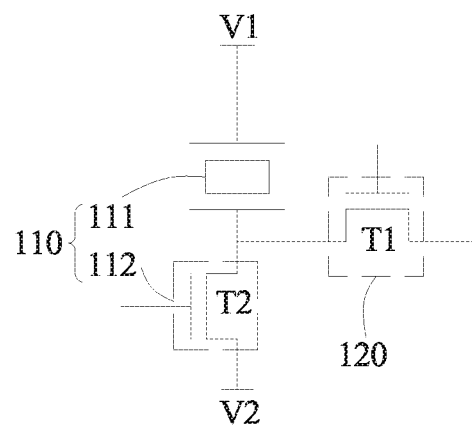
FIG. 3 shows a diagram of another implementation of the touch circuit in an embodiment of the present disclosure.
Figure 4:
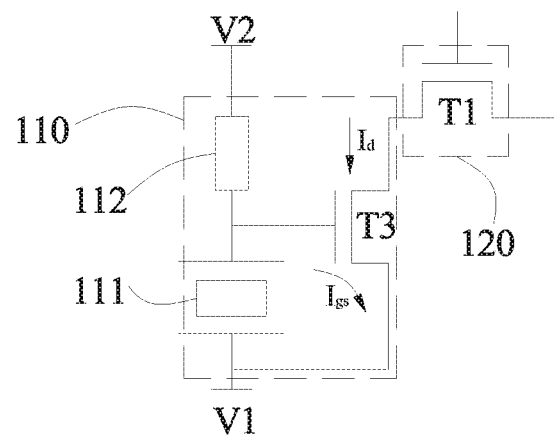
FIG. 4 shows a diagram of further another implementation of the touch circuit in an embodiment of the present disclosure.

The touch circuit is applied to a touch panel, as shown in FIGS. 2 through 4, the pressure sensing circuit 110 may include a pressure sensing resistor 111, a resistance of the pressure sensing resistor 111 varies as varying of the touch pressure, leading to variation of current flowing through the pressure sensing circuit 110, thereby an output from the output terminal of the pressure sensing circuit 110 varies. By collecting the output from the output terminal of the pressure sensing circuit 110, a touch pressure can be determined.

As described above, the touch circuit is applied to the touch panel, each touch panel includes a plurality of touch circuits, and a coordinate of a touch point can be determined by determining a position of the touch circuit 110, the output from the output terminal of which varies.

In the touch circuit, the position of the touch point and the touch pressure applied to the touch point may be determined simultaneously, so that the touch panel including the touch circuit has a simple structure.

In the embodiment, the pressure sensing resistor 111 is not limited to a specific type, for example, the pressure sensing resistor 111 may be made of QTC material.

The output circuit 120 can perform different responses according to different control signals. For example, the control signal may include a first control signal and a second control signal which are different from each other. In a case where the control terminal of the output circuit 120 receives the first control signal, the input terminal of the output circuit 120 is coupled to the output terminal of the output circuit 120, and in a case where the control terminal of the output circuit 120 receives the second control signal, the input terminal of the output circuit 120 is not coupled to the output terminal of the output circuit 120.

In the embodiment, the specific structure of the pressure sensing circuit 110 may be varied, for example, as shown in FIGS. 2 through 4, in addition to the pressure sensing resistor 111, the pressure sensing circuit 110 may further include a voltage dividing sub-circuit 112, and the touch circuit further includes a second voltage input terminal. V2.

The second voltage input terminal. V2 is configured to input a second voltage signal, and the second voltage signal is different from the first voltage signal.

In some implementations, as shown in FIGS. 2 through 4, a first terminal of the pressure sensing resistor 111 is coupled to the first voltage signal input terminal V1, a second terminal of the pressure sensing resistor 111 is coupled to a first terminal of the voltage dividing sub-circuit 112, and the second terminal of the pressure sensing resistor 111 is further coupled to the output terminal of the pressure sensing circuit 110, a second terminal of the voltage dividing sub-circuit 112 is coupled to the second voltage input terminal V2.

By providing the voltage dividing sub-circuit 112, the pressure sensing resistor 111 and the voltage dividing sub-circuit 112 constitute a voltage dividing circuit, in a case where there is no touch pressure, the output from the output terminal of the pressure sensing circuit 110 is maintained at a fixed potential, and in a case where there is a touch pressure, for example, the resistance of the pressure sensing resistor 111 varies (e.g., is reduced), thus the current flowing through the pressure sensing resistor 111 varies, thereby the voltage at the output terminal of the pressure sensing circuit 110 varies. In addition, by providing the voltage dividing sub-circuit 112, a short circuit is avoided in a case where the resistance of the pressure sensing resistor 111 is too small.

In the embodiment, the voltage dividing sub-circuit 112 is not limited to a specific structure, for example, in the touch circuit as shown in FIG. 2, the voltage dividing sub-circuit 112 includes a fixed resistor. In some implementations, for example, the voltage of the first voltage signal input from the first voltage signal input terminal V1 is higher than that of the second voltage signal input from the second voltage signal input terminal V2.

In some implementations, as shown in FIG. 3, the voltage dividing sub-circuit 112 includes a voltage dividing transistor T2 and a voltage dividing control signal input terminal, and the voltage dividing signal input terminal is configured to input a voltage dividing control signal.

As shown in FIG. 3, a gate of the voltage dividing transistor T3 is coupled to the voltage dividing control signal input terminal, a first electrode of the voltage dividing transistor T2 is coupled to the second terminal of the pressure sensing resistor 111, a second electrode of the voltage dividing transistor T2 is coupled to the second voltage input terminal V2.

The first electrode of the voltage dividing transistor T2 is control to be coupled to the second electrode of the voltage dividing transistor T2 according to the voltage dividing control signal received by the gate of the voltage dividing transistor T2, so that the voltage dividing transistor T2 operates in a saturation area. It should be noted that, the voltage dividing transistor T2 operating in the saturation area is equivalent to a resistor with a fixed resistance.

In some implementations, as shown in FIG. 4, the pressure sensing circuit 110 incudes a pressure sensing resistor 111, a voltage dividing sub-circuit 112 and an amplifying transistor T3, and the touch circuit further incudes a second voltage input terminal V2.

The second voltage input terminal V2 is configured to input a second voltage signal, and the second voltage signal is different from the first voltage signal.

A first terminal of the pressure sensing resistor 111 is coupled to a first voltage signal input terminal. V1, a second terminal of the pressure sensing resistor 111 is coupled to a first terminal of the voltage dividing sub-circuit 112, and the second terminal of the pressure sensing resistor 111 is further coupled to a gate of the amplifying transistor T3.

The first terminal of the voltage dividing sub-circuit 112 is coupled to the second terminal of the pressure sensing resistor 111, and a second terminal of voltage dividing sub-circuit 112 is coupled to the second voltage input terminal V2.

A first electrode of the amplifying transistor T3 is coupled to the first terminal of the pressure sensing resistor 111, and a second electrode of the amplifying transistor T3 is coupled to the output terminal of the pressure sensing circuit 110. As described above, the gate of the amplifying transistor T3 is coupled to the second terminal of the pressure sensing resistor 111.

The amplifying transistor T3 operates in an amplification area, as shown in FIG. 4, a current $I_d$ of the second electrode of the amplifying transistor T3 and a current $I_{gs}$ between the gate of the amplifying transistor T3 and the first electrode of the amplifying transistor T3 conform to an equation (1) as below.

$$I_d = \beta I_{gs} \quad (1)$$

In the equation (1), $\beta > 1$, thus the current $I_d$ detected by the output circuit 120 is larger than the current $I_{gs}$ between the gate of the amplifying transistor T3 and the first electrode of the amplifying transistor T3. It should be understood that, the current $I_{gs}$ between the gate of the amplifying transistor T3 and the first electrode of the amplifying transistor T3 is relating to the resistance of the pressure sensing resistor 111, thus in a case where the resistance of the pressure sensing resistor 111 varies resulting from varying of the touch pressure, the current $I_{gs}$ between the gate of the amplifying transistor T3 and the first electrode of the amplifying transistor T3 also varies. By detecting the current $I_d$ of the second electrode of the amplifying transistor T3, the current $I_{gs}$ between the gate of the amplifying transistor T3 and the first electrode of the amplifying transistor T3 can determined, thereby the touch pressure applied to the touch point can be determined, Since the current $I_d$ of the second electrode of the amplifying transistor T3 is larger than the current $I_{gs}$ between the gate of the amplifying transistor T3 and the first electrode of the amplifying transistor T3, thus is easily to be detected, thereby the detected result is more accurate, and the operation instruction of the operator can be performed accurately. In the implementation as shown in FIG. 4, for example, the voltage of the first voltage signal input from the first voltage signal input terminal. V1 is less than the voltage of the second voltage signal input from the second voltage signal input terminal V2.

It should be understood that, the current flowing from the first electrode of the amplifying transistor T3 to the gate of the amplifying transistor T3 is relating to the resistance of the pressure sensing resistor 111.

The resistance of the pressure sensing resistor 111 varies as varying of the touch pressure, and the voltage at the second terminal of the pressure sensing resistor 111 also varies. As varying of the voltage, the signal output from the second electrode of the amplifying transistor T3 varies, so that the signal output from the output circuit 120 varies.

In some implementations, as shown in FIG. 4, the voltage dividing sub-circuit 112 includes a fixed resistor. Certainly, the voltage dividing sub-circuit 112 may also be a transistor operating in the saturation area.

It should be noted that, by setting the first voltage signal, the second voltage signal and the resistance of the voltage dividing sub-circuit 112, the amplifying transistor T3 can operate in the amplification area.

In the embodiment, the output circuit 120 is not limited to a specific structure. As shown in FIGS. 2 through 4, the output circuit 120 may include an output transistor T1. As shown in FIGS. 2 through 4, a gate of the output transistor T1 is coupled to the control terminal of the output circuit 120, a first electrode of the output transistor T1 is coupled to the input terminal of the output circuit 120, and a second electrode of the output transistor T1 is coupled to the output terminal of the output circuit 120.

In a case where the gate of the output transistor T1 receives a different control signal, the output transistor T1 has a different on/off state.

In some implementations, in a case where the gate of the output transistor T1 receives the first control signal, the first electrode of the output transistor T1 is coupled to the second electrode of the output transistor T1, and in a case where the gate of the output transistor T1 receives the second control signal, the first electrode of the output transistor T1 is not coupled to the second electrode of the output transistor T1. In this case, one of the first control signal and the second control signal is a high level signal, and the other of the first control signal and the second control signal is a low level signal.

In the embodiment, the transistors are not limited to a specific type. For example, as shown in FIGS. 2 through 4, the output transistor T1 is an N-type transistor. In FIG. 3, the voltage dividing transistor T2 is an N-type transistor. In FIG. 4, the amplifying transistor T3 is also an N-type transistor.

Figure 5:
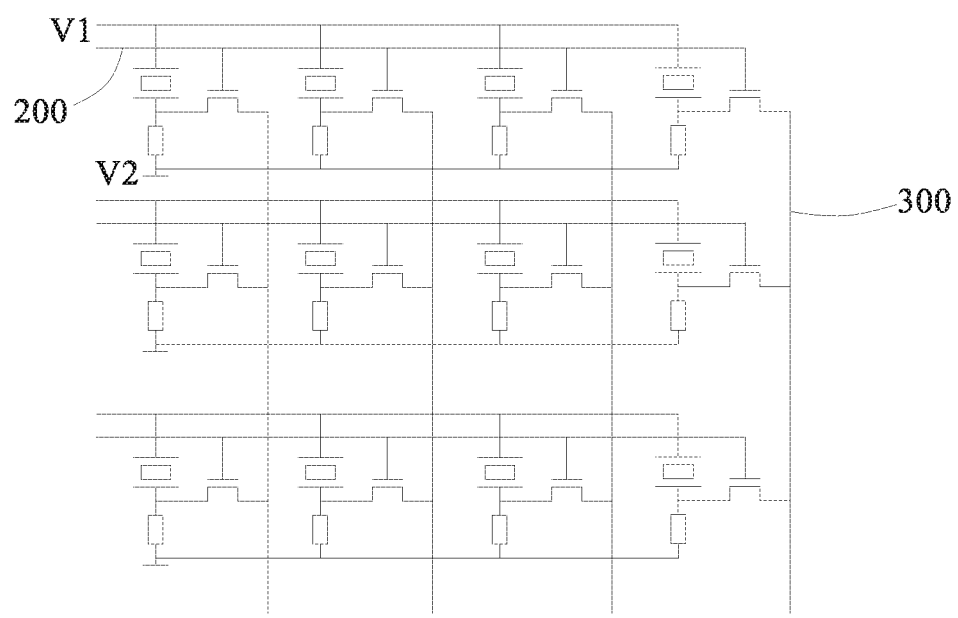
FIG. 5 shows a circuit diagram of a touch panel including the touch circuit as shown in FIG. 2.
Figure 6:
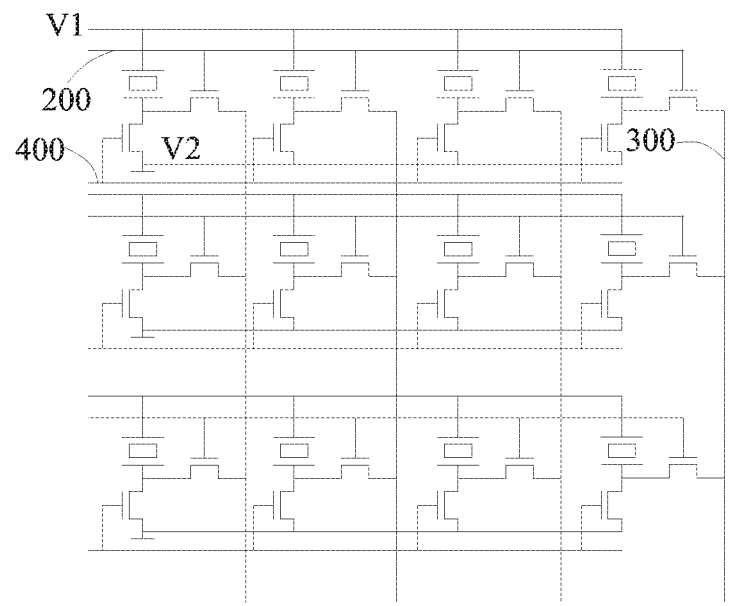
FIG. 6 shows a circuit diagram of a touch panel including the touch circuit as shown in FIG. 3.
Figure 7:
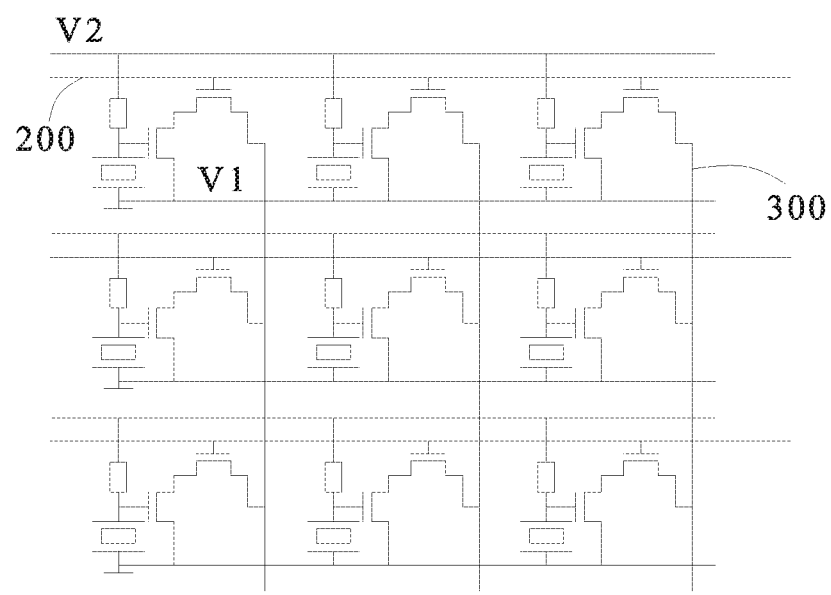
FIG. 7 shows a circuit diagram of a touch panel including the touch circuit as shown in FIG. 4.

In another aspect, an embodiment of the present disclosure provides a touch panel. As shown in FIGS. 5 through 7, the touch panel includes a plurality of touch scanning lines 200 and a plurality of touch output lines 300. The touch scanning lines 200 and the touch output lines 300 are intersected to divide the touch panel into a plurality of touch elements, and each of the touch elements includes the touch circuit in the embodiment of the present disclosure. Control terminals of output circuits 120 of touch circuits in a same row are coupled to corresponding one of the touch scanning lines 200, and output terminals of output circuits 120 of touch circuits in a same column are coupled to corresponding one of the touch output lines 300.

A control signal may be provided to the touch scanning line 200 so that on/off states between the input terminals and the output terminals of the output circuits 120 of the touch circuits in a same row are controlled by the control signal.

For example, the control signal may include a first control signal and a second control signal. In a case where the touch scanning line 200 receives the first control signal, the input terminals of the output circuits 120 of the touch circuits in a same row are coupled to the respective output terminals of the output circuits 120 of the touch circuits in a same row. In a case where he touch scanning line 200 receives the second control signal, the input terminals of the output circuits 120 of the touch circuits in a same row are not coupled to the respective output terminals of the output circuits 120 of the touch circuits in a same row.

In the touch circuit under the touch point, the resistance of the pressure sensing resistor 111 in the pressure sensing circuit 110 varies, thus the signal output from the touch circuit under the touch point is different from that output from the touch circuit not under the touch point. The position of the touch point and the touch pressure applied to the touch point can be determined according to the signal output from the touch circuit.

As described above, the touch circuit of the embodiment has a simple structure, and can simultaneously determine the position of the touch point and the touch pressure applied to the touch point.

The touch panel as shown in FIG. 5 includes the touch circuit as shown in FIG. 2.

The touch panel as shown in FIG. 6 includes the touch circuit as shown in FIG. 3. As shown in FIG. 6, the touch panel further includes a plurality of voltage dividing control signal lines 400. Each of the touch elements corresponds to one of the voltage dividing control signal lines 400, gates of voltage dividing transistor T2 of the touch circuits in a same row are coupled to corresponding one of the voltage dividing control signal lines 400. A voltage dividing control signal is provided to the gates of the voltage dividing transistors T2 in a same row through the voltage dividing control signal line 400.

The touch panel as shown in FIG. 7 includes the touch circuit as shown in FIG. 4.

Figure 8:
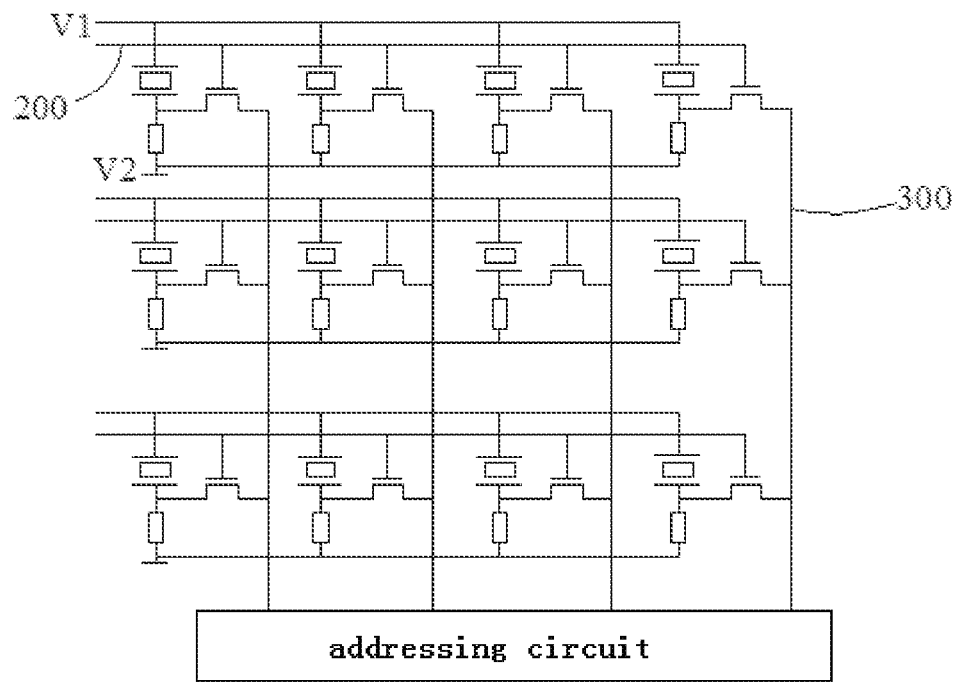
FIG. 8 shows a circuit diagram of a display device in an embodiment of the present disclosure.
Figure 9:
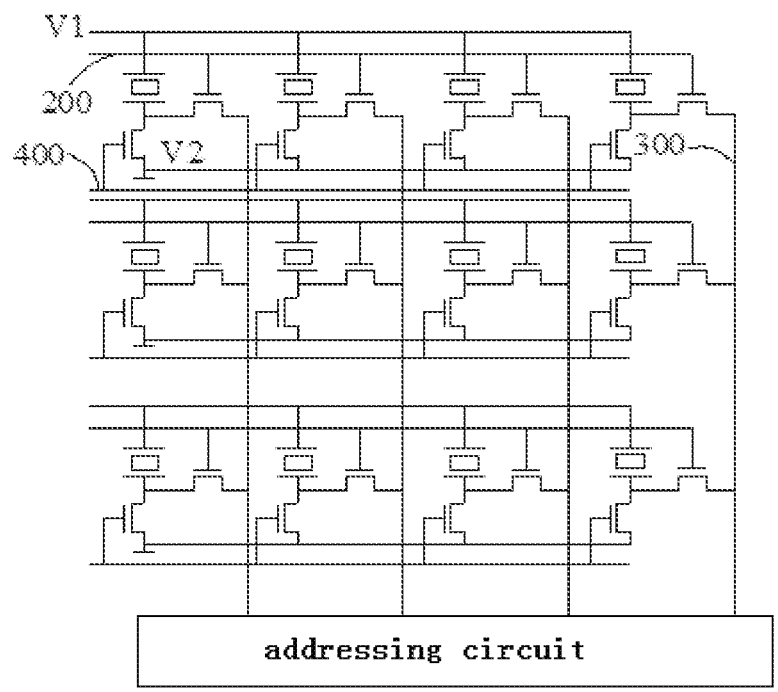
FIG. 9 shows a circuit diagram of a display device in an embodiment of the present disclosure.
Figure 10:
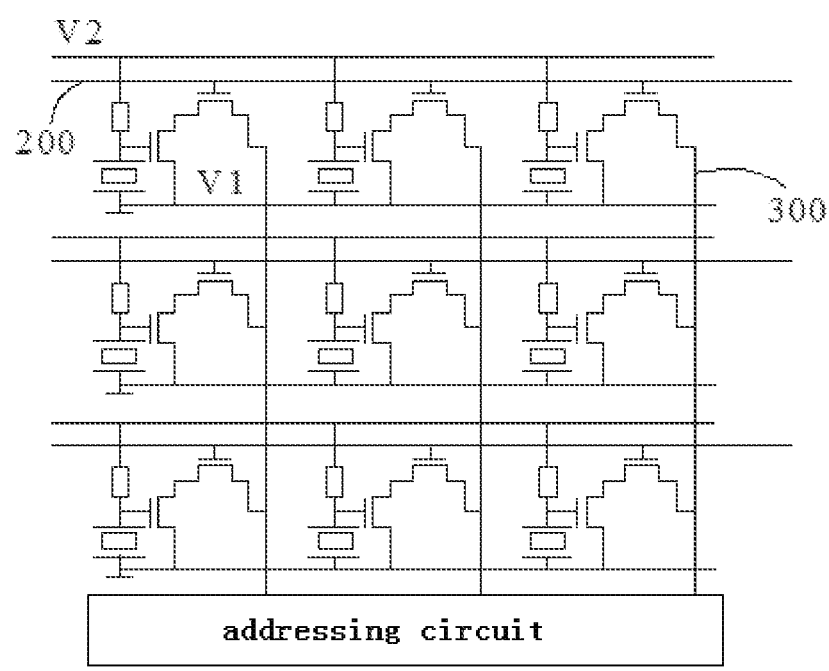
FIG. 10 shows a circuit diagram of a display device in an embodiment of the present disclosure.

In further another aspect, an embodiment of the present disclosure provides a display device including the touch panel in the embodiment of the present disclosure. The display device further includes an addressing circuit. FIGS. 8 through 10 show diagrams of the display device including the touch panel of the embodiment of the present disclosure. As shown in FIGS. 8 through 10, an input terminal of the addressing circuit is coupled to the touch output lines 300, and the addressing circuit can determine a coordinate of a touch point and a touch pressure applied to the touch point according to signals output from the touch output lines 300.

In some implementations, the display device is an on-cell display device, that is, the display device further includes a display panel, and the touch panel is attached to a display surface of the display panel.

In still another aspect, an embodiment of the present disclosure provides a display panel including a plurality of pixel elements, and at least a portion of the pixel elements each includes the touch circuit of the embodiment of the present disclosure. The display panel further includes a plurality of touch scanning lines 200 and a plurality of touch output lines 300. Control terminals of output circuits 120 of touch circuits in a same row are coupled to corresponding one of the touch scanning lines 200, and output terminals of output circuits 120 of touch circuits in a same column are coupled to corresponding one of the touch output lines 300.

In some implementations, the touch scanning lines 200 and display scanning lines of the display panel are provided in parallel, and the touch output lines 300 and data lines of the display panel are provided in parallel.

In still another aspect, an embodiment of the present disclosure provides a display device including the display panel of the embodiment of the present disclosure (as shown in any of FIGS. 5 through 7). The display device further includes an addressing circuit. Similar to those as shown in FIGS. 8 through 10, an input terminal of the addressing circuit is coupled to the touch output lines 300, and the addressing circuit can determine a coordinate of a touch point and a touch pressure applied to the touch point according to signals output from the touch output lines 300.

In some implementations, a pixel circuit and a touch circuit may be formed simultaneously, for example, transistors of the pixel circuit may be multiplexed as transistors of the touch circuit, or the transistors of the pixel circuit and the transistors of the touch circuit may be formed simultaneously in a same layer, thus steps of the process are reduced and a cost thereof is also reduced. The present disclosure is not limited by any specific manufacturing process.

The term "circuit" of the present disclosure may be implemented by software, hardware or combination thereof, for example, may be implemented by a processor, an integrated circuit or a combination thereof, and the present disclosure is not limited thereto.

It should be understood that, the above embodiments and implementations are merely exemplary embodiments and implementations for explaining principle of the present disclosure, but the present disclosure is not limited thereto. Various modifications and improvements may be made by those ordinary skilled in the art within the spirit and essence of the present disclosure, these modifications and improvements fall into the protection scope of the present disclosure.

The invention claimed is:

1. A touch circuit, comprising a first voltage input terminal, a pressure sensing circuit and an output circuit,
    the first voltage input terminal is configured to input a first voltage signal,
    an input terminal of the pressure sensing circuit is coupled to the first voltage input terminal, an output terminal of the pressure sensing circuit is coupled to an input terminal of the output circuit, the pressure sensing circuit comprises a pressure sensing resistor,
    a control terminal of the output circuit is configured to receive a control signal, and the output circuit is configured to control on/off state between the input terminal of the output circuit and the output terminal of the output circuit according to the control signal, wherein the pressure sensing circuit further comprises a voltage dividing sub-circuit, the touch circuit further comprises a second voltage input terminal, the second voltage input terminal is configured to input a second voltage signal, the second voltage signal is different from the first voltage signal, a first terminal of the pressure sensing resistor is coupled to the first voltage signal input terminal, a second terminal of the pressure sensing resistor is coupled to a first terminal of the voltage dividing sub-circuit, and the second terminal of the pressure dividing resistor is further coupled to the output terminal of the pressure sensing circuit, and a second terminal of the voltage dividing sub-circuit is coupled to the second voltage input terminal.

2. The touch circuit of claim 1, wherein the voltage dividing sub-circuit comprises a fixed resistor.

3. The touch circuit of claim 1, wherein the voltage dividing sub-circuit comprises a voltage dividing transistor and a voltage dividing control signal input terminal, the voltage dividing control signal input terminal is configured to input a voltage dividing control signal, a gate of the voltage dividing transistor is coupled to the voltage dividing control signal input terminal, a first electrode of the voltage dividing transistor is coupled to the second terminal of the pressure sensing resistor, a second electrode of the voltage dividing transistor is coupled to the second voltage input terminal, the voltage dividing transistor is configured to couple the first electrode of the voltage dividing transistor to the second electrode of the voltage dividing transistor according to the voltage dividing control signal received by the gate of the voltage dividing transistor.

4. The touch circuit of claim 1, wherein the pressure sensing circuit further comprises an amplifying transistor the second terminal of the pressure sensing resistor is coupled to a gate of amplifying transistor, a first electrode of the amplifying transistor is coupled to the first terminal of the pressure sensing resistor, and a second electrode of the amplifying transistor is coupled to the output terminal of the pressure sensing circuit.

5. The touch circuit of claim 4, wherein the voltage dividing sub-circuit comprises a fixed resistor.

6. The touch circuit of claim 1, wherein the output circuit includes an output transistor, a gate of the output transistor is coupled to the control terminal of the output circuit, a first electrode of the output transistor is coupled to the input terminal of the output circuit, and a second electrode of the output transistor is coupled to the output terminal of the output circuit.

7. A touch panel, comprising a plurality of touch scanning lines and a plurality of touch output lines, the touch scanning lines and the touch output lines are intersected to divide the touch panel into a plurality of touch elements, each of the touch elements includes a touch circuit, the touch circuit, comprises a first voltage input terminal, a pressure sensing circuit and an output circuit, the first voltage input terminal is configured to input a first voltage signal, an input terminal of the pressure sensing circuit is coupled to the first voltage input terminal, an output terminal of the pressure sensing circuit is coupled to an input terminal of the output circuit, the pressure sensing circuit comprises a pressure sensing resistor, a control terminal of the output circuit is configured to receive a control signal, the output circuit is configured to control on/off state between the input terminal of the output circuit and the output terminal of the output circuit according to the control signal, control terminals of output circuits of touch circuits in a same row are coupled to corresponding one of the touch scanning lines, and output terminals of touch circuits in a same column are coupled to corresponding one of the touch output lines.

8. The touch panel of claim 7, wherein the pressure sensing circuit further comprises a voltage dividing sub-circuit, the touch circuit further includes a second voltage input terminal, the second voltage input terminal is configured to input a second voltage signal, the second voltage signal is different from the first voltage signal, a first terminal of the pressure sensing resistor is coupled to the first voltage signal input terminal, a second terminal of the pressure sensing resistor is coupled to a first terminal of the voltage dividing sub-circuit, the second terminal of the pressure sensing resistor is further coupled to the output terminal of the pressure sensing circuit, a second terminal of the voltage dividing sub-circuit is coupled to the second voltage input terminal, the voltage dividing sub-circuit comprises a voltage dividing transistor and a voltage dividing control signal input terminal, the voltage dividing control signal input terminal is configured to input a voltage dividing control signal, a gate of the voltage dividing transistor is coupled to the voltage dividing control signal input terminal, a first electrode of the voltage dividing transistor is coupled to the second terminal of the pressure sensing resistor, a second electrode of the voltage dividing transistor is coupled to the second voltage input terminal, the voltage dividing transistor is configured to couple the first electrode of the voltage dividing transistor to the second electrode of the voltage dividing transistor according to the voltage dividing control signal received by the gate of the voltage dividing transistor, the touch panel further comprises a plurality of voltage dividing control signal lines, each row of touch elements correspond to one of the voltage dividing control signal lines, and gates of voltage dividing transistors of the touch circuits in a same row are coupled to corresponding one of the voltage dividing control signal lines.

9. A display device, comprising the touch panel of claim 7, the display device further comprises an addressing circuit, an input terminal of the addressing circuit is coupled to the touch output lines, and the addressing circuit is configured to determine a coordinate of a touch point and a touch pressure applied to the touch point according to signals output from the touch output lines.

10. A display panel, comprising a plurality of pixel elements, at least a portion of the pixel elements each comprises the touch circuit of claim 1, the display panel further comprises a plurality of touch scanning lines and a plurality of touch output lines, control terminals of output circuits of touch circuits in a same row are coupled to corresponding one of the touch scanning lines, and output terminals of touch circuits in a same column are coupled to corresponding one of the touch output lines.

11. A display device, comprising the display panel of claim 10, the display device further comprises an addressing circuit, an input terminal of the addressing circuit is coupled to the touch output lines, the addressing circuit is configured to determine a coordinate of a touch point and a touch pressure applied to the touch point according to signals output from the touch output lines.

12. The touch circuit of claim 2, wherein the output circuit includes an output transistor, a gate of the output transistor is coupled to the control terminal of the output circuit, a first electrode of the output transistor is coupled to the input terminal of the output circuit, and a second electrode of the output transistor is coupled to the output terminal of the output circuit.

13. The touch circuit of claim 3, wherein the output circuit includes an output transistor, a gate of the output transistor is coupled to the control terminal of the output circuit, a first electrode of the output transistor is coupled to the input terminal of the output circuit, and a second electrode of the output transistor is coupled to the output terminal of the output circuit.

14. The touch circuit of claim 5, wherein the output circuit includes an output transistor, a gate of the output transistor is coupled to the control terminal of the output circuit, a first electrode of the output transistor is coupled to the input terminal of the output circuit, and a second electrode of the output transistor is coupled to the output terminal of the output circuit.

* * * * *